US012599997B2

(12) United States Patent
Otawa et al.

(10) Patent No.: US 12,599,997 B2
(45) Date of Patent: Apr. 14, 2026

(54) PROCESSING MACHINE

(71) Applicant: DMG MORI CO., LTD., Nara (JP)

(72) Inventors: Takeshi Otawa, Nara (JP); Syuichi Nishi, Nara (JP); Hajime Kimura, Nara (JP)

(73) Assignee: DMG MORI CO., LTD., Nara (JP)

( * ) Notice: Subject to any disclaimer, the term of this patent is extended or adjusted under 35 U.S.C. 154(b) by 740 days.

(21) Appl. No.: 17/919,916

(22) PCT Filed: Apr. 24, 2020

(86) PCT No.: PCT/JP2020/017782
§ 371 (c)(1),
(2) Date: Dec. 24, 2022

(87) PCT Pub. No.: WO2021/215001
PCT Pub. Date: Oct. 28, 2021

(65) Prior Publication Data
US 2023/0158622 A1    May 25, 2023

(51) Int. Cl.
*B23Q 3/157* (2006.01)
*B23Q 3/155* (2006.01)
*B23Q 11/08* (2006.01)

(52) U.S. Cl.
CPC ...... B23Q 3/15713 (2013.01); B23Q 11/0891 (2013.01); *B23Q 2003/155418* (2016.11);
(Continued)

(58) Field of Classification Search
CPC ........... Y10T 483/115; Y10T 483/1748; Y10T 483/1752; Y10T 483/1755;
(Continued)

(56) References Cited

U.S. PATENT DOCUMENTS 5,669,751 A * 9/1997 Hoffman ................ B23Q 11/08
198/950
6,203,479 B1 * 3/2001 Gengo ............... B23Q 3/15526
483/62
(Continued)

FOREIGN PATENT DOCUMENTS

DE       112015002391 T5      2/2017
DE       202018102658 U1 *  5/2018  ............. B23Q 13/00
(Continued)

*Primary Examiner* — Brian D Keller
*Assistant Examiner* — Michael J Vitale
(74) *Attorney, Agent, or Firm* — IP Business Solutions, LLC.

(57)            ABSTRACT
A processing machine includes a splash guard, a tool spindle that is provided inside a processing area and holds a tool, and an automatic tool changer that is movable between an internal-side tool changing position inside the processing area and a standby position outside the processing area and changes the tool held by the tool spindle at the internal-side tool changing position. The splash guard includes a cover body that is coupled to the automatic tool changer, defines and forms the processing area when the automatic tool changer is positioned at the standby position, and enters the processing area when the automatic tool changer moves from the standby position to the internal-side tool changing position.

4 Claims, 13 Drawing Sheets

(52) U.S. Cl.
CPC ............ *B23Q 2003/155428* (2016.11); *B23Q 2003/155439* (2016.11); *B23Q 2003/155446* (2016.11); *Y10T 483/115* (2015.01); *Y10T 483/1767* (2015.01); *Y10T 483/1786* (2015.01)

(58) Field of Classification Search
CPC ......... Y10T 483/1767; Y10T 483/1769; Y10T 483/1771; Y10T 483/1779; Y10T 483/1783; Y10T 483/1786; Y10T 483/1788; Y10T 483/1891; B23Q 2003/155414; B23Q 2003/155418; B23Q 2003/155425; B23Q 2003/155428; B23Q 2003/155435; B23Q 2003/155439; B23Q 2003/155446; B23Q 3/15713; B23Q 3/15724; B23Q 11/08; B23Q 11/0891
USPC .... 483/3, 36, 38, 39, 44, 45, 46, 49, 51, 52, 483/53, 68
See application file for complete search history.

(56) References Cited

U.S. PATENT DOCUMENTS

| | | | | |
|---|---|---|---|---|
| 6,648,806 | B2 * | 11/2003 | Menzio | .............. B23Q 3/15766 |
| | | | | 414/273 |
| 9,561,570 | B2 * | 2/2017 | Kanehira | ............... B23Q 11/08 |
| 10,189,130 | B2 * | 1/2019 | Hoshi | ................ B23Q 3/15706 |
| 2009/0036282 | A1 | 2/2009 | Yasuda et al. | |
| 2013/0331245 | A1 * | 12/2013 | Koike | ................ B23Q 3/15706 |
| | | | | 483/54 |
| 2016/0193706 | A1 * | 7/2016 | Kanda | ................. B23Q 3/1554 |
| | | | | 483/58 |
| 2018/0015585 | A1 * | 1/2018 | Kasahara | ............... G01B 11/24 |
| 2020/0130123 | A1 * | 4/2020 | Iguchi | ................. B25J 15/0491 |
| 2021/0086319 | A1 * | 3/2021 | Amann | ................. B65D 25/10 |
| 2021/0138598 | A1 * | 5/2021 | Horibe | .................... F16J 15/46 |
| 2022/0009046 | A1 * | 1/2022 | Engel | ................ B23Q 3/15513 |

FOREIGN PATENT DOCUMENTS

| | | | | | |
|---|---|---|---|---|---|
| FR | 2907357 | A1 | * | 4/2008 | ............ B23Q 11/08 |
| JP | H04128134 | U | | 11/1992 | |
| JP | 2001198751 | A | | 7/2001 | |
| JP | 2002178235 | A | * | 6/2002 | |
| JP | 2004306185 | A | * | 11/2004 | ............ B23Q 11/08 |
| JP | 2009034803 | A | | 2/2009 | |
| JP | 2015123575 | A | | 7/2015 | |
| TW | 201707844 | A | * | 3/2017 | |
| WO | WO-2015178096 | A1 | * | 11/2015 | ........ B23Q 3/15706 |
| WO | WO-2018092794 | A1 | * | 5/2018 | ........ B23Q 3/15724 |

* cited by examiner

FIG.9

PROCESSING MACHINE

TECHNICAL FIELD

The present invention relates to a processing machine.

BACKGROUND ART

For example, Japanese Utility Model Laying-Open No. 4-128134 (PTL 1) discloses an NC lathe including a main tool changer including an intermediate pot and an auxiliary tool changer that transfers a tool between a tool magazine and the intermediate pot. The main tool changer moves from a tool transfer position located on a tool magazine side in a processing area to an optimum Z-axis changing position in the processing area, and performs tool change between the intermediate pot and a tool rest.

In addition, Japanese Patent Laying-Open No. 2009-34803 (PTL 2) discloses a machine tool including a tool changing unit that travels between a tool magazine position and a changing position to convey a tool, and a splash guard that covers the processing area. The tool changing unit moves from a plurality of changing positions to the selected changing position, and performs the tool change between the tool changing unit and the tool spindle. In the splash guard, a shutter is disposed corresponding to each of the plurality of changing positions.

CITATION LIST

Patent Literature

PTL 1: Japanese Utility Model Laying-Open No. 4-128134

PTL 2: Japanese Patent Laying-Open No. 2009-34803

SUMMARY OF INVENTION

Technical Problem

In the NC lathe disclosed in PTL 1, the main tool changer waits at the tool transfer position in the processing area while the tool of the next process is inserted into the intermediate pot. In this case, the main tool changer at the standby position is exposed to atmosphere in the processing area, so that there is a possibility that cutting oil, chips, or the like adheres to the main tool changer.

In the machine tool disclosed in PTL 2, the shutter that can be opened and closed is provided in the splash guard in order to enable the tool change between the tool spindle in the processing area and the tool changing unit traveling outside the processing area. In this case, because the space at which the shutter performs the opening and closing operation is required to be secured, a size of the machine tool becomes large.

An object of the present invention is to solve the above problems, and it is an object of the present invention to provide a processing machine capable of preventing cutting oil, chips, or the like from adhering to an automatic tool changer while miniaturization is achieved.

Solution to Problem

A processing machine according to the present invention includes a splash guard that defines and forms a processing area, a tool holder that is provided inside the processing area and holds a tool, and an automatic tool changer that is movable between a first tool changing position inside the processing area and a standby position outside the processing area and changes the tool held by the tool holder at the first tool changing position. The splash guard includes a cover body that is coupled to the automatic tool changer, defines and forms the processing area when the automatic tool changer is positioned at the standby position, and enters the inside of the processing area when the automatic tool changer moves from the standby position to the first tool changing position.

According to the processing machine configured as described above, when the automatic tool changer is positioned at the standby position outside the processing area, the cover body defines and forms the processing area, so that cutting oil, chips, or the like in the processing area can be prevented from adhering to the automatic tool changer. In addition, when the automatic tool changer moves from the standby position to the first tool changing position in the processing area, the cover body enters the inside of the processing area together with the automatic tool changer, so that a size of the processing machine can be reduced.

Preferably, the processing machine further includes a workpiece spindle that holds the workpiece and rotates the workpiece about a rotation axis parallel to the horizontal direction. The automatic tool changer is movable in the axial direction of the rotation axis inside the processing area.

According to the processing machine configured as described above, the automatic tool changer moves in the rotation axis direction of the workpiece spindle in the processing area, so that the automatic tool changer and the tool holder can be brought close to each other in a shorter time. Thus, the time required for tool change between the automatic tool changer and the tool holder can be shortened.

Preferably, the processing machine further includes a tool magazine that is provided outside the processing area and stores a plurality of tools. The automatic tool changer is further movable between the standby position and a second tool changing position outside the processing area, and changes the tool between the tool magazine and the automatic tool changer at the second tool changing position. The processing machine further includes a first coupling mechanism operable between a first state in which the automatic tool changer and the cover body are coupled by the first coupling mechanism when the automatic tool changer is positioned at the standby position and a second state in which the coupling between the automatic tool changer and the cover body is released when the automatic tool changer moves from the standby position to the second tool changing position.

According to the processing machine configured as described above, when the automatic tool changer is positioned at the standby position, the automatic tool changer and the cover body are coupled by the first coupling mechanism, so that the cover body can immediately enter the inside of the processing area together with the automatic tool changer during the change of the tool held by the tool holder. In addition, when the automatic tool changer moves from the standby position to the second tool changing position, the first coupling mechanism releases the coupling between the automatic tool changer and the cover body, so that it is possible to direct only the automatic tool changer to the second tool changing position where the tool magazine is located while the state in which the processing area is defined and formed by the cover body is maintained.

Preferably, the splash guard further includes a guard body having an opening in which the cover body is disposed when the automatic tool changer is positioned at the standby position. The processing machine further includes a second coupling mechanism operable between a third state in which the guard body and the cover body are coupled by the coupling mechanism when the automatic tool changer is positioned in the standby position and a fourth state in which the coupling between the guard body and the cover body is released when the automatic tool changer moves from the standby position to the first tool changing position.

According to the processing machine configured as described above, when the automatic tool changer is positioned at the standby position, the guard body and the cover body are coupled by the second coupling mechanism, whereby the cover body is more firmly fixed to the guard body. Thus, leakage of cutting oil, chips, or the like can reliably prevented from the inside to the outside of the processing area. When the automatic tool changer moves from the standby position to the first tool changing position, the second coupling mechanism releases the coupling between the guard body and the cover body, so that the cover body entering the processing area from the guard body can be separated.

Preferably, the automatic tool changer includes an arm portion capable of turning about a turning axis parallel to a horizontal direction, and the arm portion includes a gripping portion capable of gripping a tool. The cover body is disposed on a side of the arm portion.

According to the processing machine configured as described above, the cover body is disposed on the side of the arm portion. Thus, during the tool change between the automatic tool changer and the tool holder, the arm portion and the cover body can be prevented from interfering with each other when the arm portion turns about the turning axis parallel to the horizontal direction to perform the tool change.

Advantageous Effects of Invention

As described above, according to the present invention, the processing machine capable of preventing cutting oil, chips, or the like from adhering to the automatic tool changer while the size is reduced can be provided.

BRIEF DESCRIPTION OF DRAWINGS

FIG. 9 is another perspective view illustrating the processing machine when the automatic tool changer is positioned at the standby position.

DESCRIPTION OF EMBODIMENT

Figure 1:
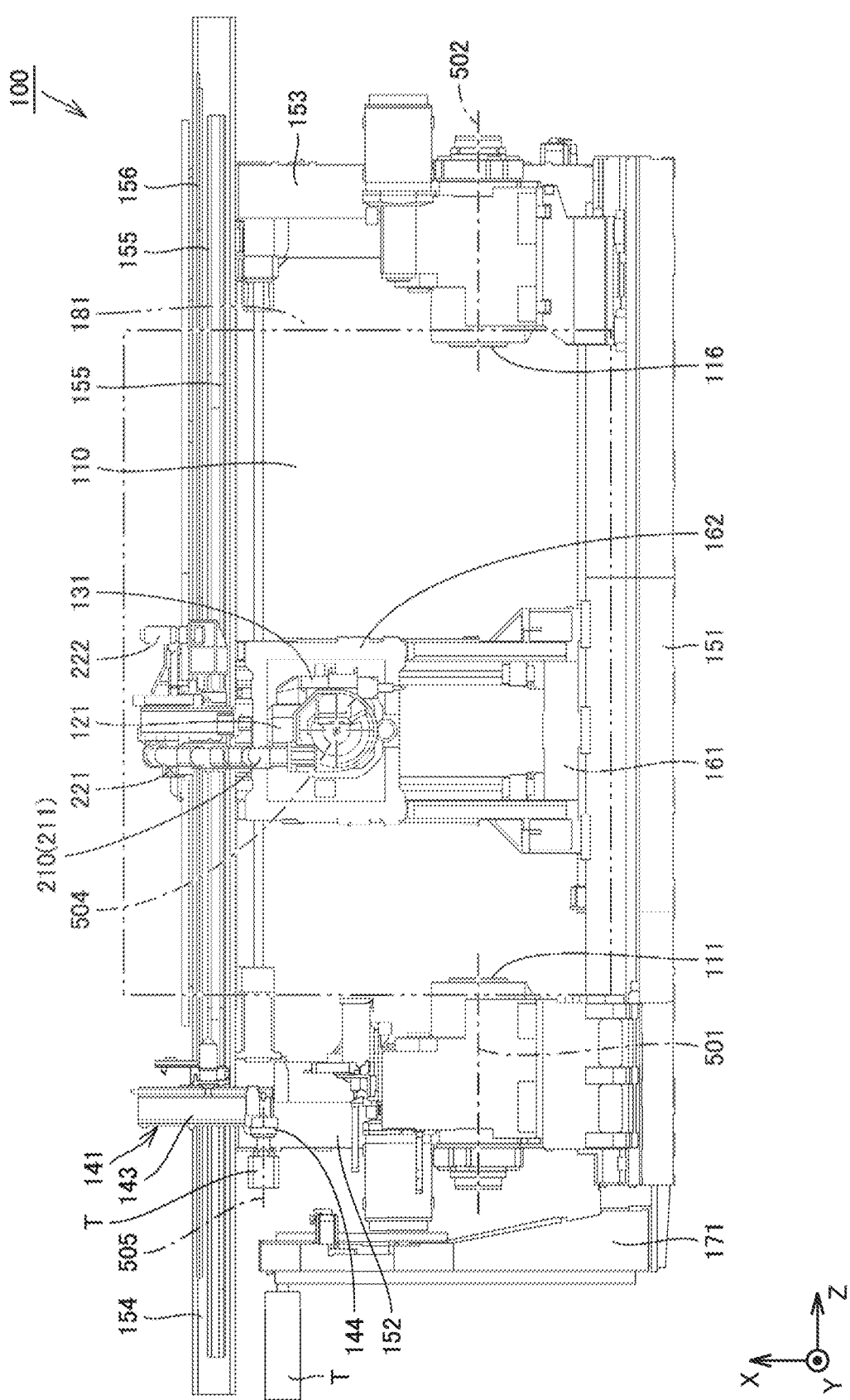
FIG. 1 is a front view illustrating a processing machine according to an embodiment of the present invention.

An embodiment of the present invention will be described with reference to the drawings. In the drawings referred to below, the same or corresponding member is denoted by the same reference numeral.

Figure 2:
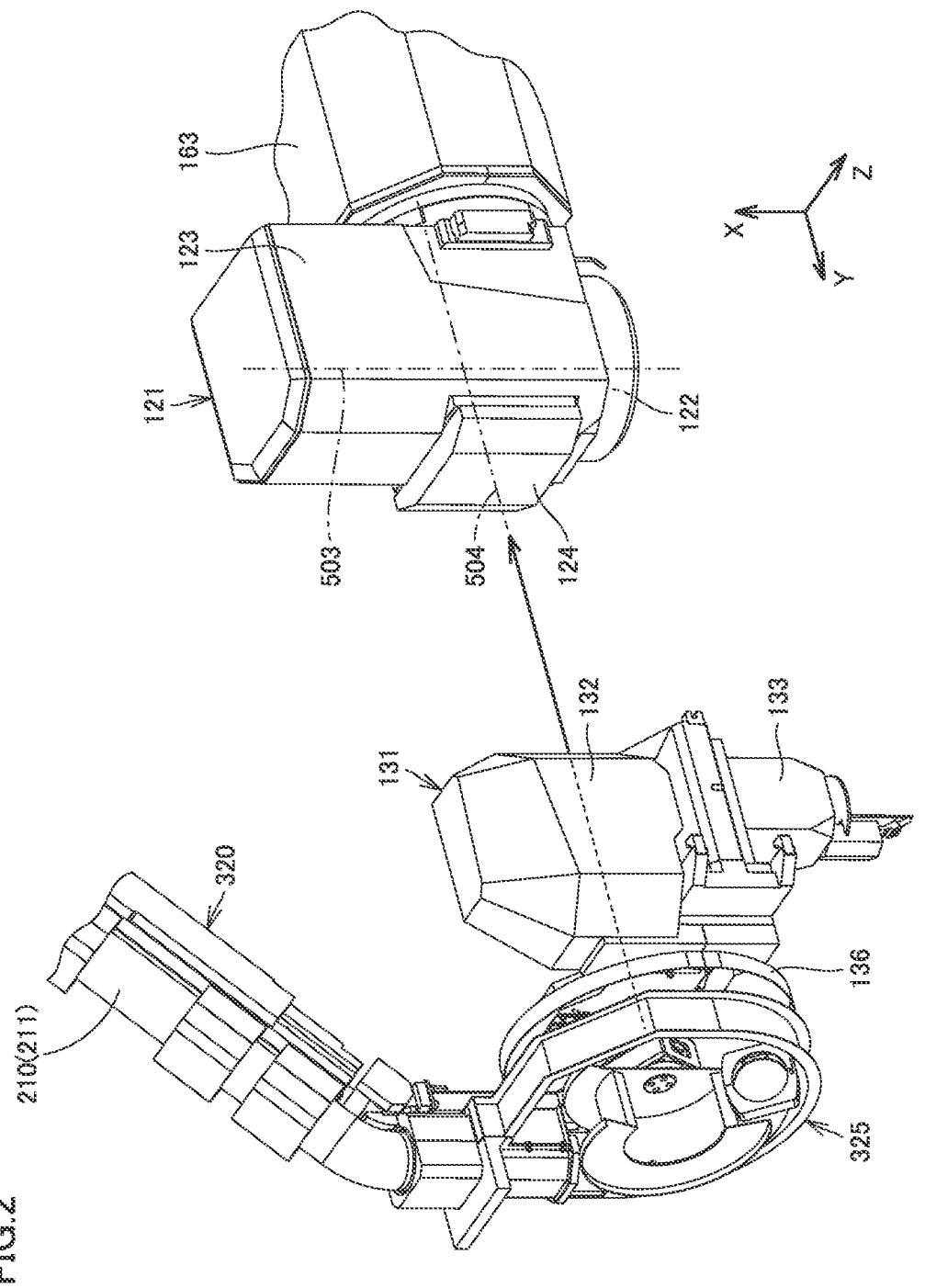
FIG. 2 is a perspective view illustrating attachment and detachment of a tool spindle and an additive-manufacturing head in the processing machine in FIG. 1.

FIG. 1 is a front view illustrating a processing machine according to an embodiment of the present invention. In FIG. 1, an inside of the processing machine is illustrated by seeing through an exterior cover having an appearance of the processing machine. FIG. 2 is a perspective view illustrating attachment and detachment of a tool spindle and an additive-manufacturing head in the processing machine in FIG. 1.

Referring to FIGS. 1 and 2, a processing machine 100 is an AM/SM hybrid processing machine capable of performing additive manufacturing (AM) processing for a workpiece and subtractive manufacturing (SM) processing for a workpiece. Processing machine 100 has a turning function using a stationary tool and a milling function using a rotating tool as a function of SM processing.

Processing machine 100 is a numerically control (NC) processing machine in which various operations for workpiece processing are automated by numerical control of a computer.

In the present specification, an axis parallel to a left-right direction (width direction) of processing machine 100 and extending in a horizontal direction is referred to as a "Z-axis (first axis)", an axis parallel to a front-rear direction (depth direction) of processing machine 100 and extending in the horizontal direction is referred to as a "Y-axis (second axis)", and an axis extending in a vertical direction is referred to as an "X-axis". A right direction in FIG. 1 is referred to as "+Z-axis direction", and a left direction is referred to as "−Z-axis direction". In FIG. 1, a front direction of a paper surface is referred to as a "+Y-axis direction", and a back direction is referred to as a "−Y-axis direction". In FIG. 1, an upward direction is referred to as a "+X-axis direction", and a downward direction is referred to as a "−X-axis direction". The X-axis, the Y-axis, and the Z-axis are three axes orthogonal to each other.

First, an overall structure of processing machine 100 will be described. Processing machine 100 includes a splash guard 181. Splash guard 181 defines and forms a processing area 110 where the workpiece is processed.

Processing machine 100 further includes a bed 151, a first workpiece spindle 111, a second workpiece spindle 116, and a tool rest (not illustrated).

Bed 151 is a base member supporting first workpiece spindle 111, second workpiece spindle 116, the tool rest, and the like, and is installed on a floor of a factory or the like.

First workpiece spindle 111 and second workpiece spindle 116 are disposed opposite to each other in the Z-axis direction. First workpiece spindle 111 and second workpiece spindle 116 are configured to be able to hold the workpiece. A chuck mechanism (not illustrated) detachably holding the workpiece is provided in first workpiece spindle 111 and second workpiece spindle 116. First workpiece spindle 111 mainly rotates the held workpiece about a rotation axis 501 parallel to the Z-axis during turning of the workpiece using a fixed tool. Second workpiece spindle 116 mainly rotates the held workpiece about a rotation axis 502 parallel to the Z-axis during the turning of the workpiece using the fixed tool.

First workpiece spindle 111 is fixed to bed 151. Second workpiece spindle 116 is provided to be movable in the Z-axis direction by various feed mechanisms, guide mechanisms, servomotors, and the like. Second workpiece spindle 116 may be configured to be fixed to bed 151. A tailstock supporting the rotation center of the workpiece held by first workpiece spindle 111 may be provided instead of second workpiece spindle 116.

The tool rest (not illustrated) is provided in processing area 110. The tool rest is configured to be able to hold a plurality of fixing tools for workpiece subtractive manufacturing (turning). The tool rest is supported by bed 151 with a saddle or the like (not illustrated) interposed therebetween. The tool rest is provided movably in the X-axis direction and the Z-axis direction by various feed mechanisms, guide mechanisms, servomotors, and the like provided in the saddle or the like. The tool rest may have a milling function for rotating the rotating tool.

Processing machine 100 further includes a first longitudinal frame 152, a second longitudinal frame 153, a first transverse frame 154, and a second transverse frame 311 (see FIG. 3 described later).

First longitudinal frame 152 and second longitudinal frame 153 have a columnar shape in which the X-axis direction (vertical direction) is a longer direction. First longitudinal frame 152 and second longitudinal frame 153 are provided apart from each other in the Z-axis direction. Lower ends of first longitudinal frame 152 and second longitudinal frame 153 are connected to bed 151.

First transverse frame 154 and second transverse frame 311 have a beam shape in which the Z-axis direction (left-right direction) is the longer direction. First transverse frame 154 and second transverse frame 311 are made of a pipe member having a rectangular closed section.

First transverse frame 154 and second transverse frame 311 are provided apart from each other in the Y-axis direction. First transverse frame 154 is provided at a position shifted in the +Y-axis direction from second transverse frame 311. Both ends of first transverse frame 154 in the Z-axis direction are connected to upper ends of first longitudinal frame 152 and second longitudinal frame 153, respectively. Both ends of second transverse frame 311 in the Z-axis direction are connected to upper ends of first longitudinal frame 152 and second longitudinal frame 153, respectively.

First longitudinal frame 152, second longitudinal frame 153, first transverse frame 154, and second transverse frame 311 form a gate-shaped frame structure on bed 151.

Processing machine 100 further includes a saddle 161, a cross slide 162, and a ram 163.

Saddle 161 is supported by bed 151. Saddle 161 is provided on bed 151 and between first longitudinal frame 152 and second longitudinal frame 153 in the Z-axis direction. Saddle 161 has a shape rising upward from bed 151 toward first transverse frame 154 and second transverse frame 311. Saddle 161 is provided to be movable in the Z-axis direction by various feed mechanisms, guide mechanisms, servomotors, and the like provided on bed 151 and the like.

Cross slide 162 is supported by saddle 161. Cross slide 162 has a flat plate shape parallel to the X-axis-Z-axis plane as a whole. Cross slide 162 is attached to a front surface of saddle 161 facing the +Y-axis direction. Cross slide 162 is provided to be movable in the X-axis direction (vertical direction) by various feed mechanisms, guide mechanisms, servomotors, and the like provided on saddle 161 and the like.

Ram 163 is supported by cross slide 162. Ram 163 has a cylindrical shape extending along the Y-axis direction as a whole. Ram 163 is provided so as to penetrate cross slide 162 and to protrude into processing area 110 in the Y-axis direction. Ram 163 is provided movably in the Y-axis direction by various feed mechanisms, guide mechanisms, servomotors, and the like provided on cross slide 162 and the like.

Processing machine 100 further includes a tool spindle 121. Tool spindle 121 is provided in processing area 110. Tool spindle 121 is configured to be able to hold the rotating tool for workpiece subtractive manufacturing (milling). Tool spindle 121 is provided with a clamp mechanism (not illustrated) detachably holding the rotating tool. Tool spindle 121 rotates the held rotating tool about a rotation axis 503 parallel to the X-axis-Z-axis plane during the milling of the workpiece using the rotating tool.

Tool spindle 121 is supported by ram 163. Tool spindle 121 is connected to a tip of ram 163 in the +Y-axis direction. Tool spindle 121 is three-dimensionally movable in processing area 110 by the movement of saddle 161 in the Z-axis direction, the movement of cross slide 162 in the X-axis direction, and the movement of ram 163 in the Y-axis direction.

Tool spindle 121 is further provided so as to be turnable about a turning axis 504 parallel to the Y-axis (B-axis turning). A turning range of tool spindle 121 is preferably within a range greater than or equal to ±90° with respect to a reference posture (posture in FIGS. 1 and 2) in which a spindle end face 122 of tool spindle 121 faces downward. As an example, the turning range of tool spindle 121 is a range of ±120° with respect to the reference posture.

Processing machine 100 further includes an automatic tool changer (ATC) 141 and a tool magazine 171.

Tool magazine 171 accommodates a plurality of rotating tools T used for milling the workpiece. Tool magazine 171 is provided outside processing area 110. Tool magazine 171 is provided on the opposite side of processing area 110 across first workpiece spindle 111 (first longitudinal frame 152). First workpiece spindle 111 (first longitudinal frame 152) is disposed between tool magazine 171 and processing area 110 in the Z-axis direction.

Automatic tool changer 141 is configured to be able to exchange tools between tool spindle 121 in processing area 110 and tool magazine 171 outside processing area 110.

Automatic tool changer 141 is supported by first transverse frame 154. Automatic tool changer 141 is movable in the Z-axis direction by various feed mechanisms, guide mechanisms, servomotors, and the like provided on first transverse frame 154 and the like.

Automatic tool changer 141 is movable between a standby position (position of automatic tool changer 141 in FIG. 1) that is located outside processing area 110 and above first workpiece spindle 111 and at which automatic tool changer 141 waits, an internal-side tool changing position that is located inside processing area 110 and at an arbitrary coordinate in the Z-axis direction and at which automatic tool changer 141 performs tool change with tool spindle 121, and a magazine-side tool changing position that is located outside processing area 110 and on an opposite side of the internal-side tool changing position with the standby position interposed therebetween and at which automatic tool changer 141 performs tool replacement with tool magazine 171.

Automatic tool changer 141 and a cover structure around automatic tool changer 141 will be described in detail later.

Processing machine 100 further includes additive-manufacturing head 131. Additive-manufacturing head 131 performs additive manufacturing (directed energy deposition) by ejecting the material powder and irradiating the workpiece with laser beam. Metal powder such as stainless steel, Stellite, Inconel, or titanium can be used as the material powder. The material powder is not limited to the metal powder.

Additive-manufacturing head 131 includes a head body 132 and a laser tool 133. The laser beam and the material powder are introduced into head body 132. Laser tool 133 emits the laser beam toward the workpiece and determines an irradiation region of the laser beam on the workpiece. The material powder introduced into additive-manufacturing head 131 is discharged toward the workpiece through a nozzle (not illustrated).

Processing machine 100 includes a plurality of laser tools 133. The plurality of laser tools 133 are different in the shape and/or a size of the irradiation region of the laser beam defined on the workpiece. Any one of the plurality of laser tools 133 is selectively mounted on head body 132 in accordance with a condition of the additive manufacturing to be executed.

Additive-manufacturing head 131 further includes a disk portion 136. Disk portion 136 has a disk shape in which a thickness direction is the Y-axis direction. Disk portion 136 is connected to head body 132. Disk portion 136 is provided at a position bent at a right angle from the front end portion of head body 132 in the +Y-axis direction. Tool spindle 121 includes a front surface portion 124 and a side surface portion 123. Front surface portion 124 faces the +Y-axis direction. Side surface portion 123 faces the +Z-axis direction in the reference posture of tool spindle 121.

Additive-manufacturing head 131 is detachably attached to tool spindle 121. Additive-manufacturing head 131 is mounted on tool spindle 121 such that head body 132 is opposite to side surface portion 123 and such that disk portion 136 is opposite to front surface portion 124.

Additive-manufacturing head 131 (disk portion 136) and the tool spindle (front surface portion 124) have a built-in clamp mechanism using spring force or the like. When additive-manufacturing head 131 is mounted on tool spindle 121, the clamp mechanism operates to connect additive-manufacturing head 131 to tool spindle 121. Additive-manufacturing head 131 is connected to tool spindle 121 to be integrally movable with tool spindle 121 in the X-axis direction, the Y-axis direction, and the Z-axis direction.

Figure 3:
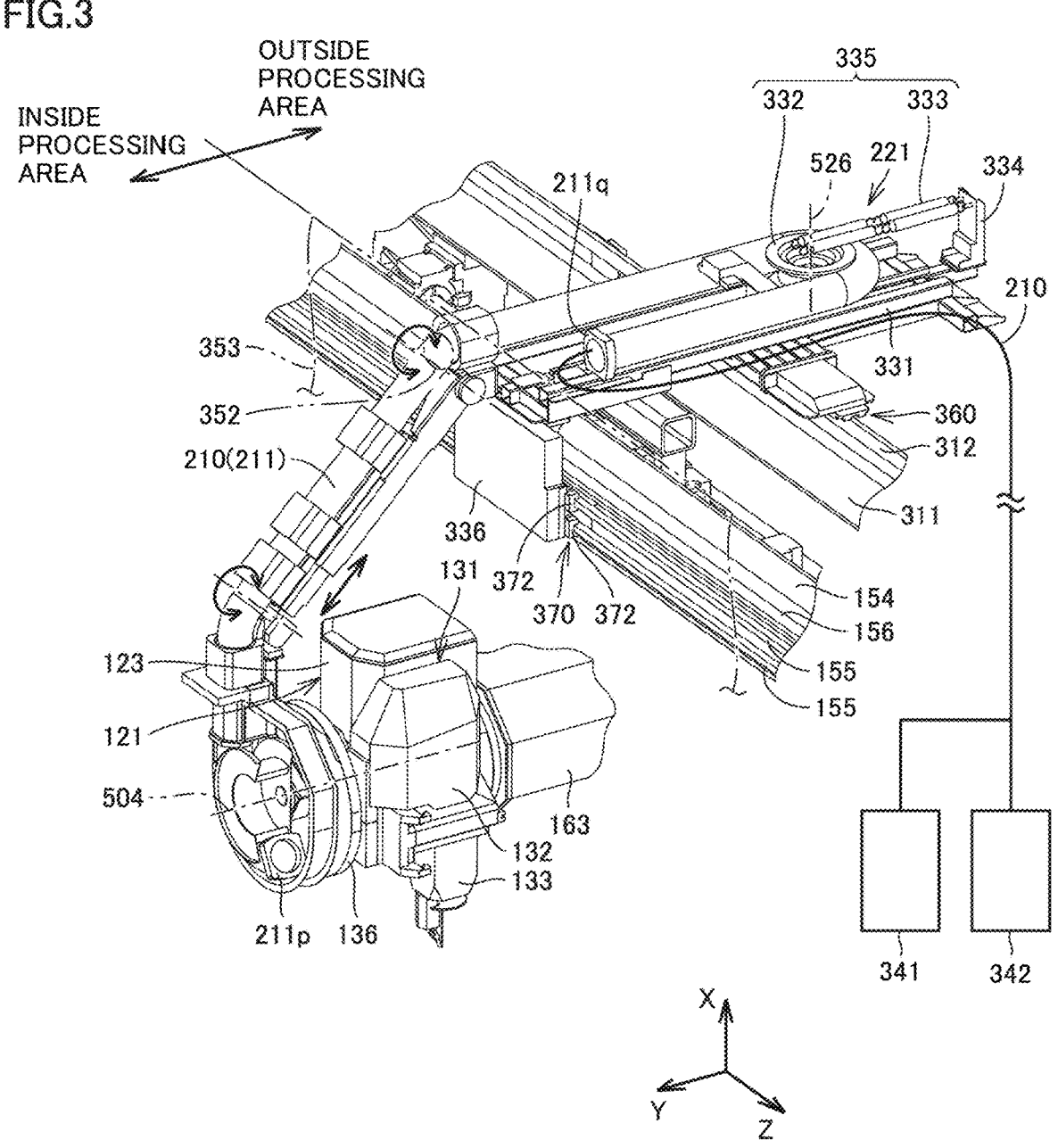
FIG. 3 is a perspective view illustrating a structure supplying a laser beam and a material powder to the additive-manufacturing head in FIG. 1.
Figure 4:
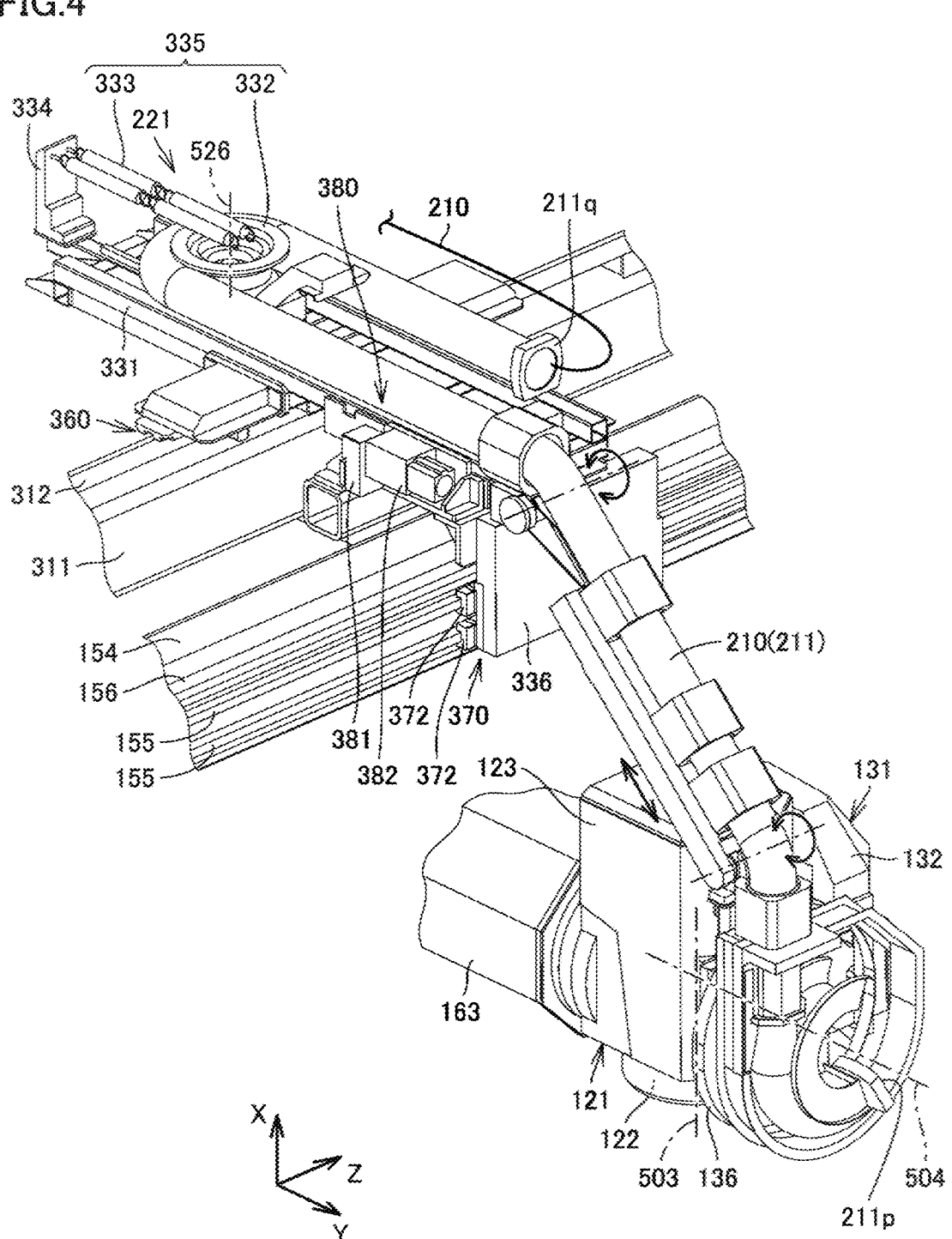
FIG. 4 is another perspective view illustrating the structure supplying the laser beam and the material powder to the additive-manufacturing head in FIG. 1.

FIGS. 3 and 4 are perspective views illustrating a structure supplying the laser beam and the material powder to the additive-manufacturing head in FIG. 1.

Referring to FIGS. 1 to 4, processing machine 100 further includes a material powder supply device 341, a laser oscillation device 342, and a line body 210.

Material powder supply device 341 and laser oscillation device 342 are installed outside processing area 110. Material powder supply device 341 feeds the material powder used for the additive manufacturing toward additive-manufacturing head 131. Laser oscillation device 342 oscillates the laser beam used for the additive manufacturing.

Line body 210 supplies the material powder from material powder supply device 341 to additive-manufacturing head 131, and supplies the laser beam from laser oscillation device 342 to additive-manufacturing head 131. Line body 210 extends from additive-manufacturing head 131. Line body 210 is drawn from the inside to the outside of processing area 110, and connected to material powder supply device 341 and laser oscillation device 342.

Line body 210 has flexibility, and can be bent and deformed when receiving external force. Line body 210 includes an optical fiber guiding the laser beam, a pipe guiding the material powder, an air pipe serving as a flow path of air, a gas pipe serving as a flow path of an inert gas, a cooling pipe serving as a flow path of a refrigerant, electric wiring, and a flexible tube 211 accommodating these.

Referring to FIGS. 3 and 4, processing machine 100 further includes a support 221. Support 221 is provided outside processing area 110. Support 221 supports line body 210 drawn from processing area 110 outside processing area 110. Support 221 is provided above additive-manufacturing head 131. Support 221 is supported by first transverse frame 154 and second transverse frame 311.

Support 221 includes a base 331, a pulley portion 332, and a coil spring (elastic member) 333.

Base 331 is provided on first transverse frame 154 and second transverse frame 311. Base 331 is provided across first transverse frame 154 and second transverse frame 311 in top view. Line body 210 drawn from the inside to the outside of processing area 110 is routed on base 331. Line body 210 routed on base 331 is inserted into cable bear (registered trademark) (not illustrated) that can stroke in the Z-axis direction, and then extends toward material powder supply device 341 and laser oscillation device 342.

Pulley portion 332 is supported by base 331. Pulley portion 332 is provided so as to be rotatable about a rotation axis 526 parallel to the X-axis direction (vertical direction) and to be slidable in the Y-axis direction.

One end of coil spring 333 is connected to pulley portion 332. The other end of coil spring 333 is connected to base 331 with a bracket 334 interposed therebetween. Coil spring 333 applies elastic force in the −Y-axis direction to pulley portion 332. Coil spring 333 applies the elastic force in the direction away from processing area 110 in top view to pulley portion 332.

Flexible tube 211 is made of a flexible tube. Flexible tube 211 extends between the inside and the outside of processing area 110. One end 211p of flexible tube 211 is disposed inside processing area 110. The other end 211q of flexible tube 211 is disposed outside processing area 110.

Flexible tube 211 drawn from the inside to the outside of processing area 110 extends in the −Y-axis direction on base 331. Flexible tube 211 is wound around pulley portion 332, is inverted by 180°, and extends in the +Y-axis direction. The other end 211q of flexible tube 211 is fixed to base 331 at the tip of flexible tube 211 extending in the +Y-axis direction.

Pulley portion 332 and coil spring 333 constitute a tension applying mechanism 335. Tension applying mechanism 335 applies tension in the direction away from additive-manu-facturing head 131 in processing area 110 to line body 210 (flexible tube 211). Tension applying mechanism 335 applies tensile force from the inside to the outside of processing area 110 to line body 210 (flexible tube 211).

According to such the configuration, deflection of line body 210 in processing area 110 can be prevented. When pulley portion 332 slides in the Y-axis direction, the length of line body 210 in processing area 111 can be automatically adjusted in accordance with the position of additive-manu-facturing head 131.

The elastic member constituting tension applying mecha-nism 335 is not particularly limited, and for example, a gas spring may be used instead of coil spring 333.

Processing machine 100 further includes a first guide mechanism 370 and a second guide mechanism 360. First guide mechanism 370 and second guide mechanism 360 guide support 221 along the Z-axis direction. First guide mechanism 370 and second guide mechanism 360 are pro-vided apart from each other in the Y-axis direction.

Support 221 further includes a block 336. Block 336 is fixed to base 331. Block 336 is opposite to first transverse frame 154 in the Y-axis direction.

First guide mechanism 370 includes rail 155 and a slider 372. First guide mechanism 370 includes two sets of rails 155 and sliders 372. Rail 155 is attached to first transverse frame 154. Rail 155 extends in the Z-axis direction. Slider 372 is attached to block 336. Slider 372 is engaged with rail 155 with a plurality of balls (not illustrated) interposed therebetween. Slider 372 and rail 155 constitute a linear guide mechanism in the Z-axis direction.

Second guide mechanism 360 is provided at a position away from first guide mechanism 370 in the −Y-axis direc-tion. Second guide mechanism 360 includes a rail 312. Rail 312 is attached to second transverse frame 311. Rail 312 extends in the Z-axis direction. A pair of first rollers sand-wiching rail 312 from both sides in the Y-axis direction and rotatable about a rotation axis parallel to the X-axis direction and a pair of second rollers sandwiching the rail 312 from both sides in the X-axis direction and rotatable about a rotation axis parallel to the Y-axis direction are attached to support 221 (base 331).

Referring to FIG. 4, processing machine 100 further includes a coupling mechanism 380. Coupling mechanism 380 includes an air cylinder 382 and a block 381.

Block 381 is attached to saddle 161. A pin insertion hole (not illustrated) is made in block 381. Air cylinder 382 is attached to support 221. Air cylinder 382 includes a pin (not illustrated) movable forward and backward in the Y-axis direction. A state in which tool spindle 121 and support 221 are coupled to each other is obtained when the pins of air cylinder 382 is inserted into the pin insertion holes made in block 381, and a state in which the coupling between tool spindle 121 and support 221 is released is obtained when the pins of air cylinder 382 is removed from the pin insertion holes made in block 381.

During the additive manufacturing for the workpiece, tool spindle 121 and support 221 are coupled by coupling mechanism 380, so that support 221 can be moved in the Z-axis direction integrally with tool spindle 121 and addi-tive-manufacturing head 131. During the subtractive manu-facturing for the workpiece, when the coupling between tool spindle 121 and support 221 is released by coupling mecha-nism 380, support 221 and additive-manufacturing head 131 can be separated from tool spindle 121, and tool spindle 121 can be moved alone.

Support 221 is further configured to be movable in the Z-axis direction in a single state separated from tool spindle 121 (self-traveling mechanism).

More specifically, a rack 156 is provided in first transverse frame 154. Rack 156 extends in the Z-axis direction. A servomotor 222 (not illustrated in FIGS. 3 and 4, see FIG. 1) and a pinion (not illustrated) connected to an output axis of servomotor 222 and engaged with rack 156 are provided in support 221. While the coupling between tool spindle 121 and support 221 by coupling mechanism 380 is released, the pinion receiving the rotation from servomotor 222 rotates in a forward direction or a reverse direction, so that support 221 moves in the +Z-axis direction or the −Z-axis direction.

Figure 5:
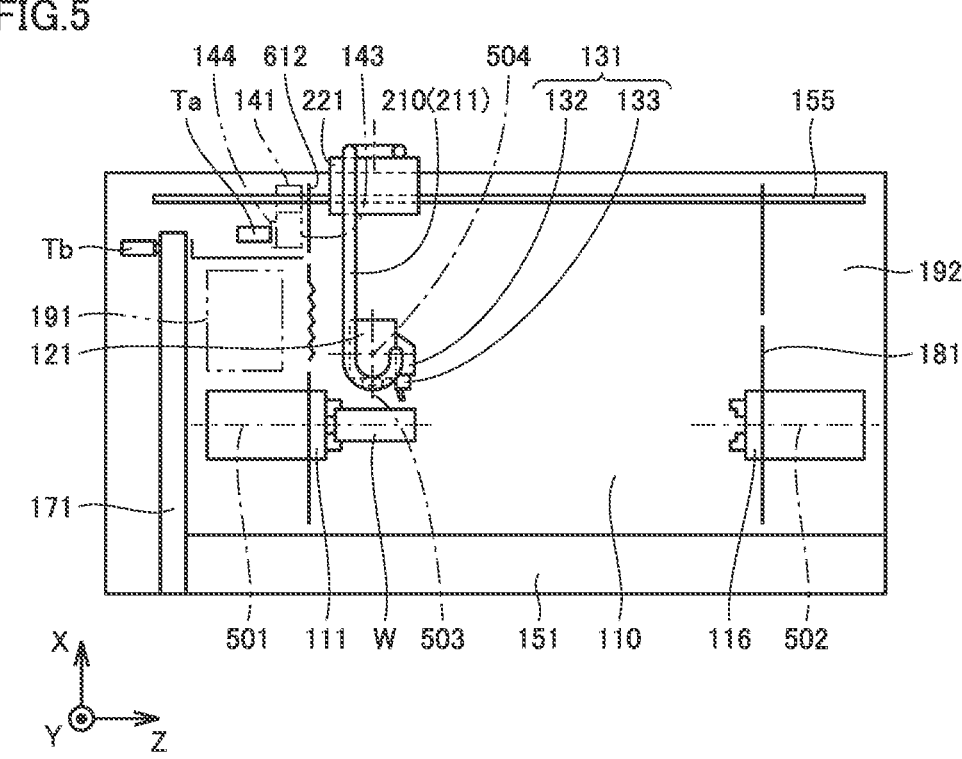
FIG. 5 is a front view schematically illustrating a first process of a processing flow of a workpiece in the processing machine in FIG. 1.
Figure 6:
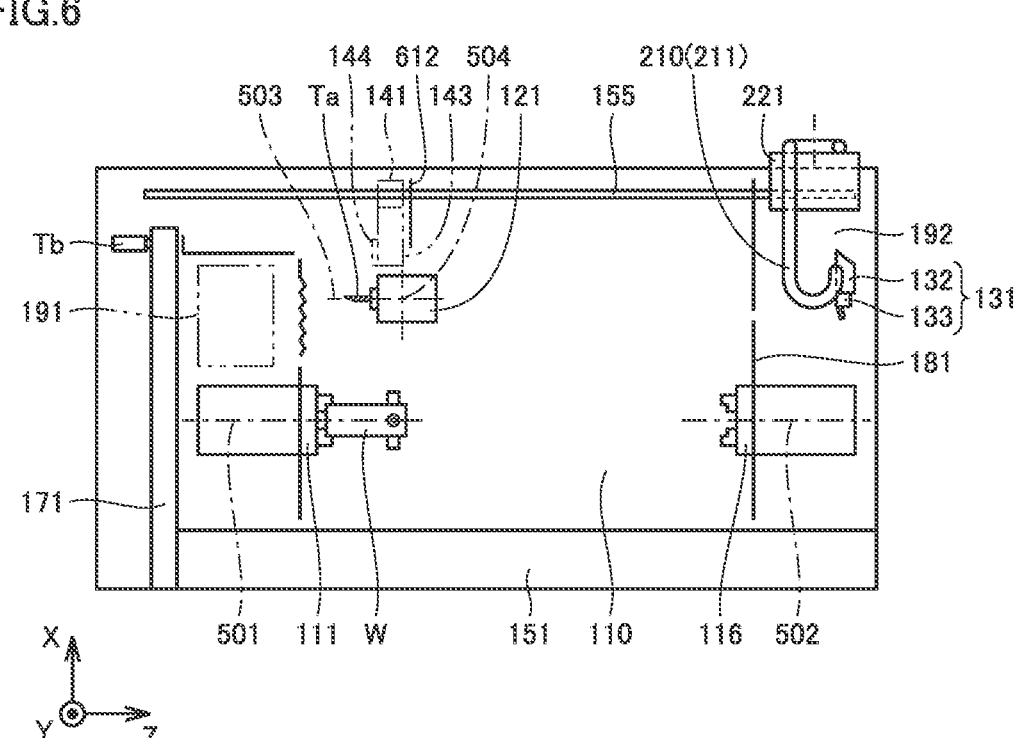
FIG. 6 is a front view schematically illustrating a second process of the processing flow of the workpiece in the processing machine in FIG. 1.
Figure 7:
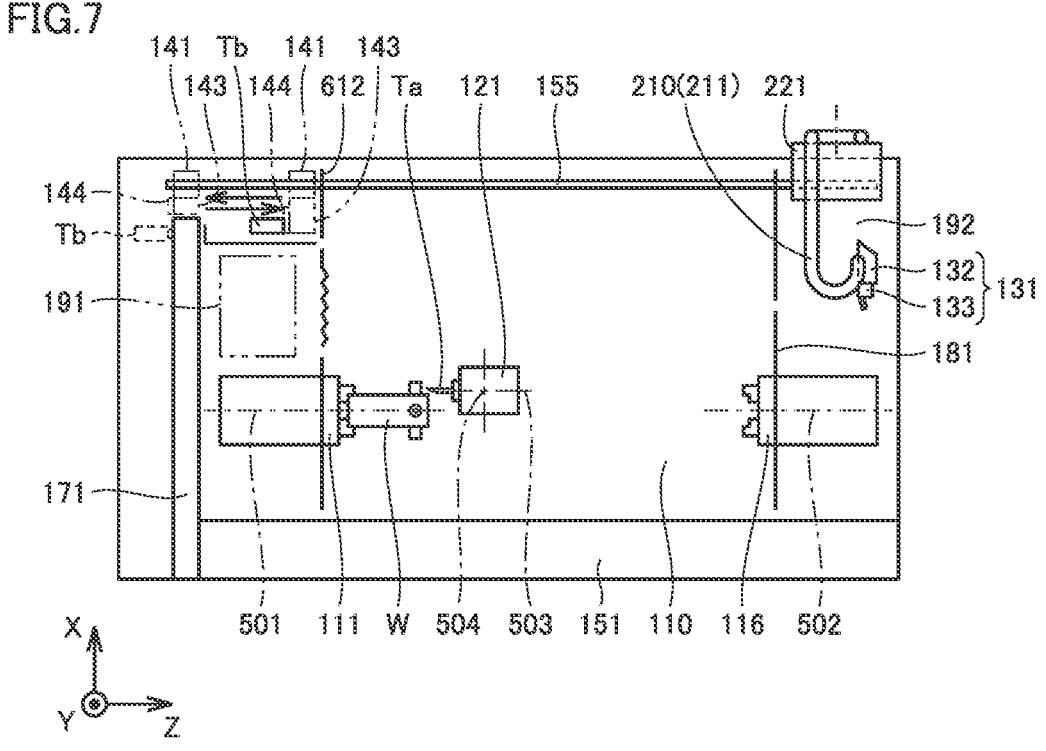
FIG. 7 is a front view schematically illustrating a third process of the processing flow of the workpiece in the processing machine in FIG. 1.

FIGS. 5 to 7 are front views schematically illustrating a processing flow of the workpiece in the processing machine in FIG. 1.

Referring to FIGS. 5 to 7, processing machine 100 further includes a laser tool storage portion 191 and a head storage portion 192. Laser tool storage portion 191 is configured to be able to store a plurality of laser tools 133. Head storage portion 192 is configured to be able to store additive-manufacturing head 131 separated from tool spindle 121 during subtractive manufacturing for the workpiece.

Laser tool storage portion 191 and head storage portion 192 are provided outside processing area 110. Laser tool storage portion 191 is provided between first workpiece spindle 111 and the standby position of automatic tool changer 141 in the X-axis direction (vertical direction). Head storage portion 192 is provided above second work-piece spindle 116.

As illustrated in FIG. 5, during the additive manufacturing for a workpiece W, additive-manufacturing head 131 is mounted on tool spindle 121. When tool spindle 121 moves in the X-axis direction, the Y-axis direction, and the Z-axis direction, additive-manufacturing head 131 also moves in processing area 110 integrally with tool spindle 121. Thus, the processing position of the additive manufacturing for by additive-manufacturing head 131 is three-dimensionally dis-placed. Furthermore, when tool spindle 121 turns about turning axis 504, additive-manufacturing head 131 also turns about turning axis 504 integrally with tool spindle 121. Thus, the direction of the additive manufacturing for by additive-manufacturing head 131 (the irradiation direction of the laser beam with respect to the workpiece) can be freely changed.

When additive-manufacturing head 131 is moved to the position opposite to laser tool storage portion 191 in the Z-axis direction, laser tool 133 mounted on additive-manu-facturing head 131 can be replaced with another laser tool 133 stored in the laser tool storage portion 191.

As illustrated in FIG. 6, when the subtractive manufac-turing for workpiece W is performed subsequent to the additive manufacturing for workpiece W, the connection between tool spindle 121 and additive-manufacturing head 131 is released, and the connection between support 221 and saddle 161 is also released. Additive-manufacturing head 131 integrated with support 221 is moved from the inside of processing area 110 to head storage portion 192 outside processing area 110 by the self-traveling mechanism pro-vided in support 221.

On the other hand, tool spindle 121 from which additive-manufacturing head 131 is separated is turned by 90° about turning axis 504 from the reference posture. Automatic tool changer 141 is moved from the standby position to the internal-side tool changing position in processing area 110. A tool Ta gripped by automatic tool changer 141 is mounted on tool spindle 121 by automatic tool changer 141. When automatic tool changer 141 is moved from the internal-side tool changing position to the standby position, the mounting of the tool to tool spindle 121 is completed.

The internal-side tool changing position is appropriately set such that a movement amount of tool spindle 121 from the position of tool spindle 121 to the internal-side tool changing position at the start of tool change is shortened. The internal-side tool changing position set in this way may be selected from any coordinate in the Z-axis direction, or selected from a plurality of coordinate candidates in the Z-axis direction.

As illustrated in FIG. 7, during the subtractive manufacturing for workpiece W, the workpiece is milled by tool Ta held by tool spindle 121 while additive-manufacturing head 131 is stored in head storage portion 192.

During this time, automatic tool changer 141 is moved from the standby position to the magazine-side tool changing position, and tool Tb stored in tool magazine 171 at the magazine-side tool changing position is moved to automatic tool changer 141. Automatic tool changer 141 holding tool Tb is moved from the magazine-side tool changing position to the standby position to prepare for the next tool change in tool spindle 121.

Figure 8:
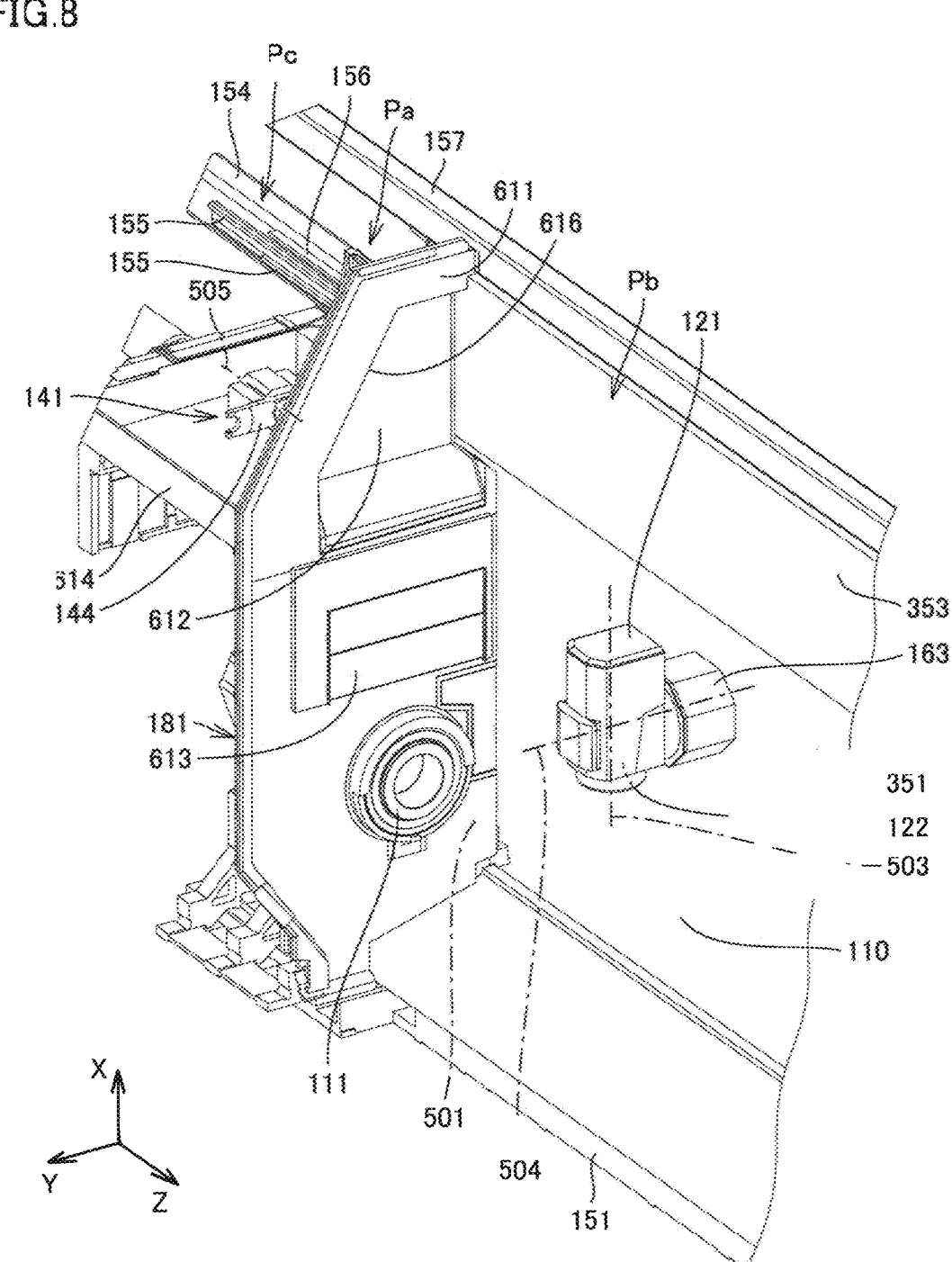
FIG. 8 is a perspective view illustrating the processing machine when an automatic tool changer is positioned at a standby position.
Figure 9:
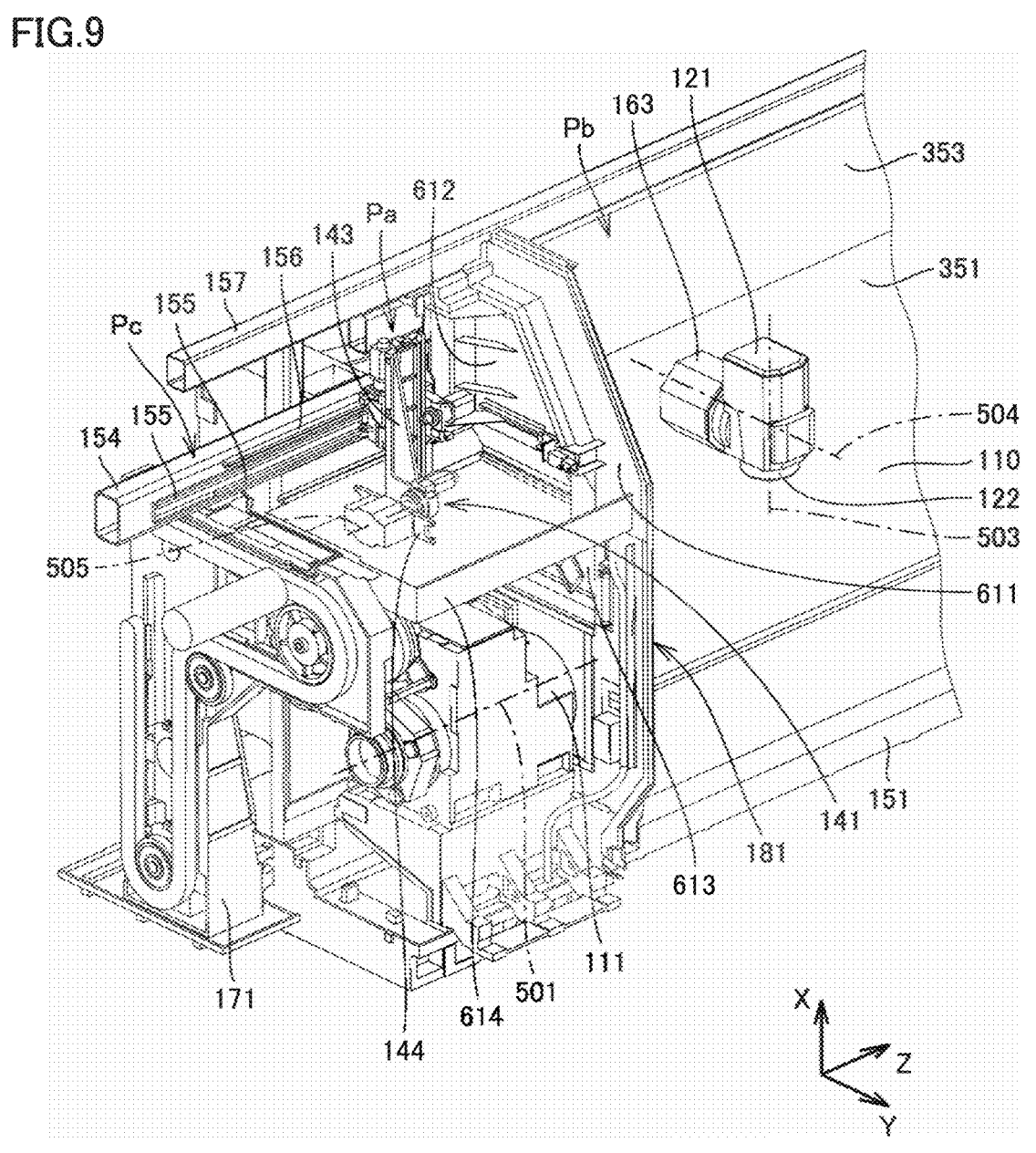
Figure 10:
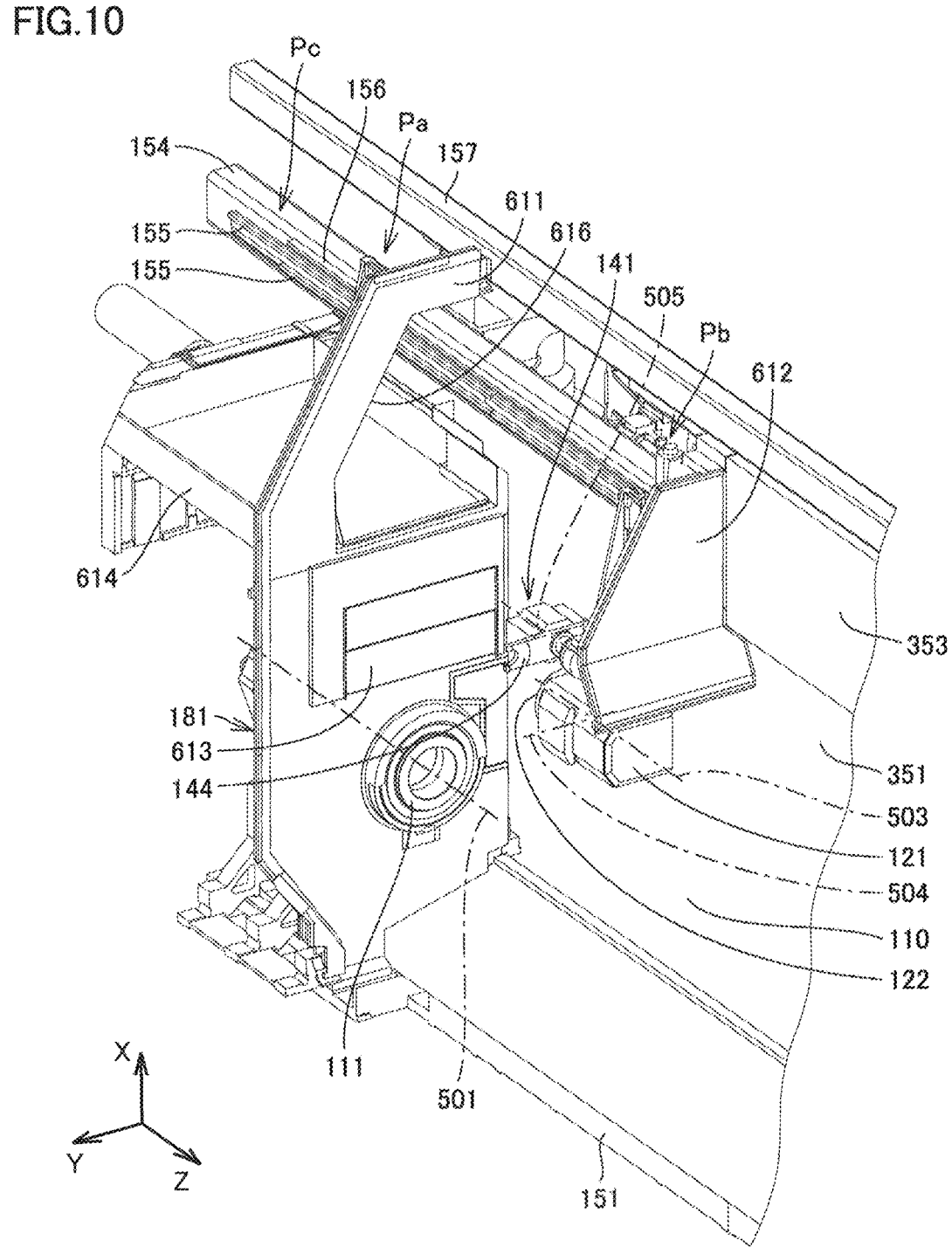
FIG. 10 is a perspective view illustrating the processing machine when the automatic tool changer is positioned at an internal-side tool changing position.
Figure 11:
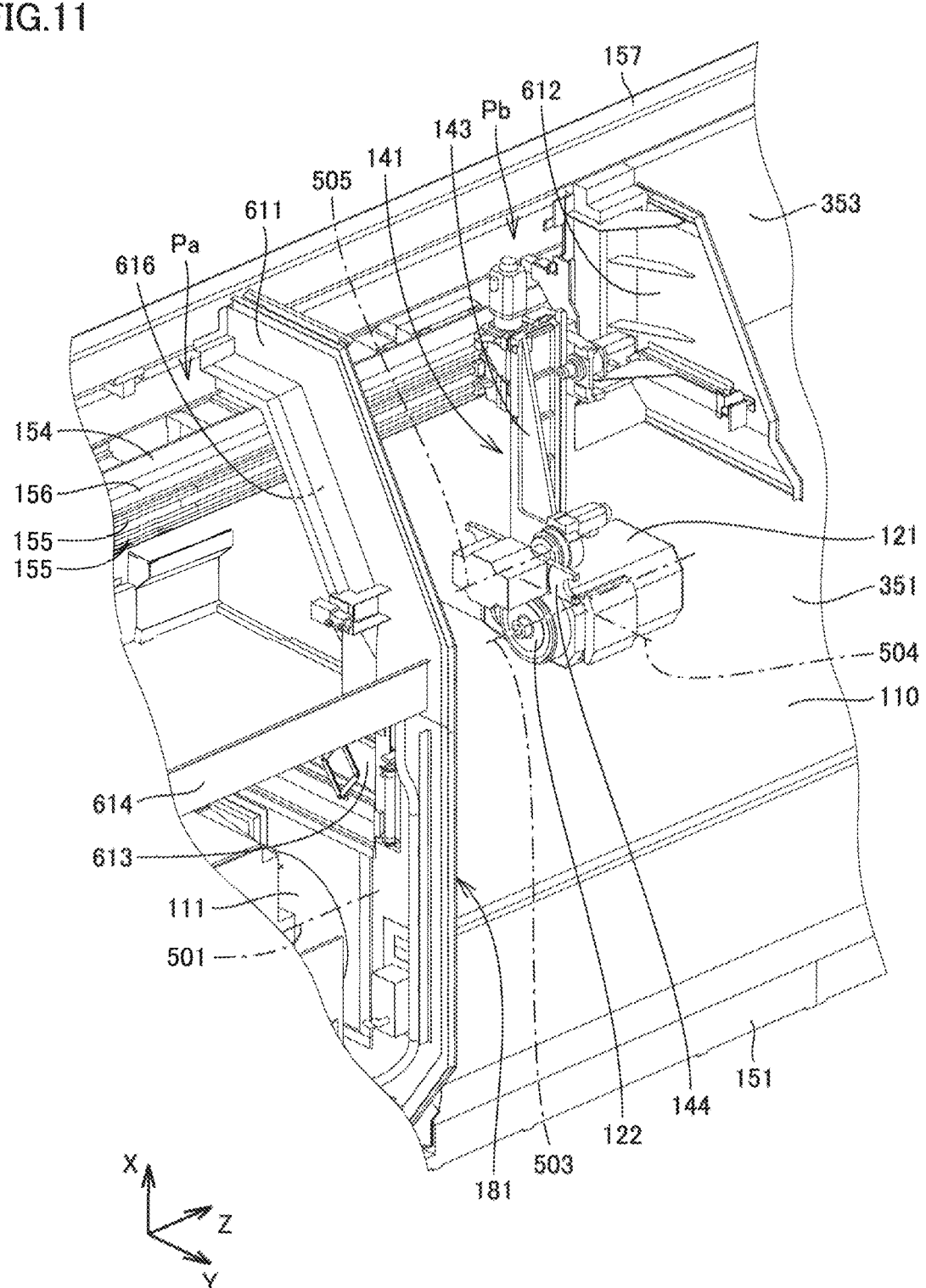
FIG. 11 is another perspective view illustrating the processing machine when the automatic tool changer is positioned at the internal-side tool changing position.
Figure 12:
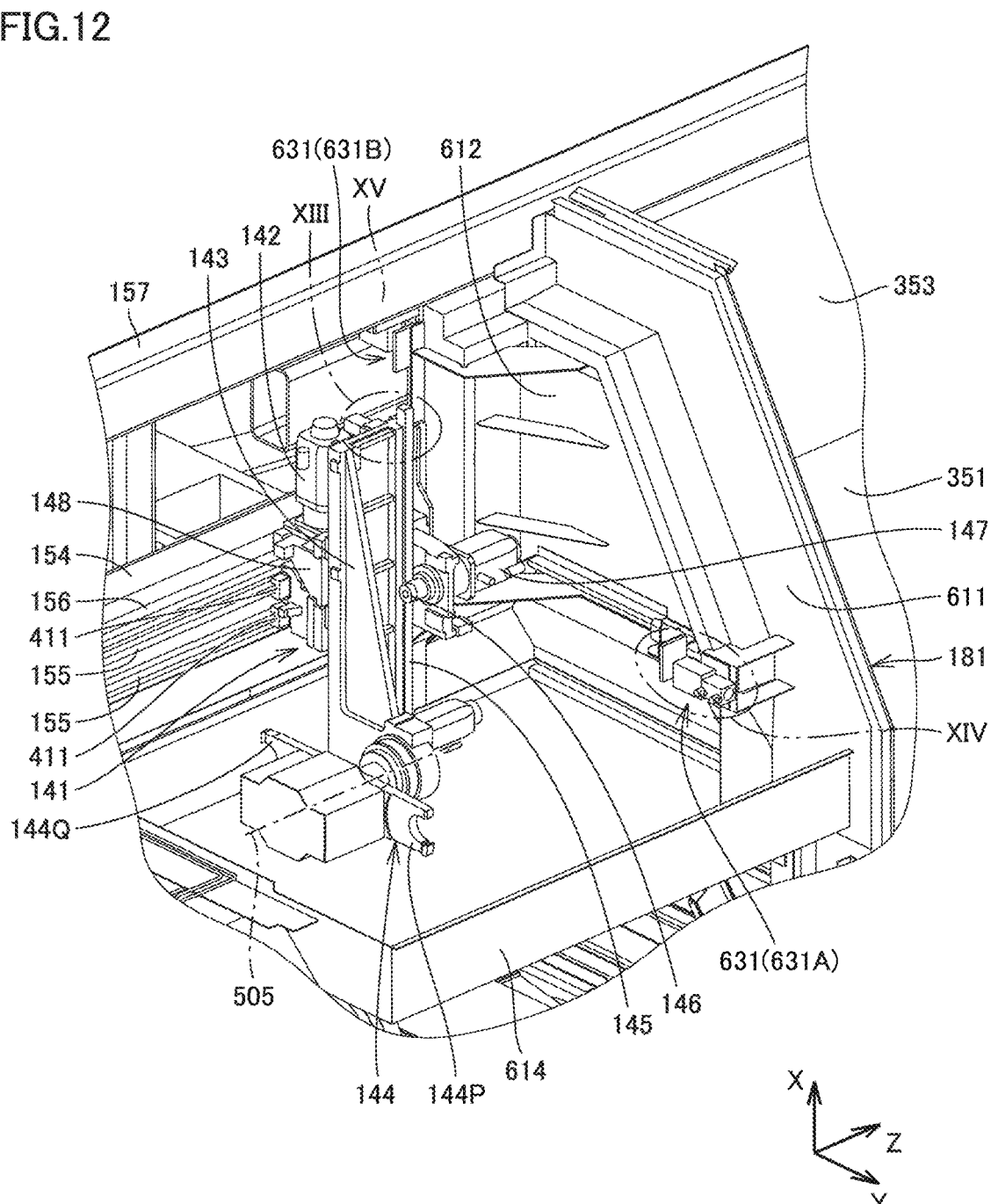
FIG. 12 is an enlarged perspective view illustrating the automatic tool changer in FIG. 9.

Automatic tool changer 141 and the cover structure around automatic tool changer 141 will be described below. FIGS. 8 and 9 are perspective views illustrating the processing machine when the automatic tool changer is positioned at the standby position. FIGS. 10 and 11 are perspective views illustrating the processing machine when the automatic tool changer is positioned at the internal-side tool changing position. FIG. 12 is an enlarged perspective view illustrating the automatic tool changer in FIG. 9.

FIGS. 8 to 11 illustrate a standby position Pa of automatic tool changer 141, an internal-side tool changing position Pb, and a magazine-side tool changing position Pc.

With reference to FIGS. 8 to 12, automatic tool changer 141 includes a base 148, a lifting arm 143, and a double arm (arm portion) 144.

Base 148 is supported by first transverse frame 154. Base 148 is movable in the Z-axis direction by various feeding mechanisms, guide mechanisms, servomotors, and the like.

More specifically, a rack 156 and a rail 155 are provided in first transverse frame 154. Rack 156 and rail 155 extend in the Z-axis direction. A servomotor 142 and a pinion (not illustrated) connected to an output axis of servomotor 142 are provided in base 148. A slider 411 that is slidable in the Z-axis direction while engaged with rail 155 is further provided in base 148. When the pinion receiving the rotation from servomotor 142 rotates in the forward direction or the reverse direction, base 148 moves in the +Z-axis direction or the −Z-axis direction.

In the embodiment, automatic tool changer 141 and support 221 share a guide mechanism (rail 155) and a feed mechanism (rack 156) that enable the movement in the Z-axis direction.

Lifting arm 143 is supported by base 148. Lifting arm 143 extends in an arm shape such that the X-axis direction (vertical direction) is the longer direction. Lifting arm 143 can be lifted and lowered in the X-axis direction by various feeding mechanisms, guide mechanisms, and servomotors.

More specifically, a rack 145 is provided in lifting arm 143. Rack 145 extends in the X-axis direction. A servomotor 147 and a pinion 146 connected to an output axis of servomotor 147 are provided in base 148. When pinion 146 that receives the rotation from servomotor 147 rotates in the forward direction or the reverse direction, lifting arm 143 moves up in the +X-axis direction or moves down in the −X-axis direction.

Double arm 144 is supported by lifting arm 143. Double arm 144 is connected to a lower end portion of lifting arm 143. Double arm 144 includes a first gripping portion 144P and a second gripping portion 144Q. Each of first gripping portion 144P and second gripping portion 144Q is configured to be able to grip the tool (shank portion of the tool). Double arm 144 extends in an arm shape between first gripping portion 144P and second gripping portion 144Q.

Double arm 144 is turnable about a turning axis 505 and is slidable in the axial direction of turning axis 505. Turning axis 505 is disposed at a center position between first gripping portion 144P and second gripping portion 144Q. Turning axis 505 extends in the horizontal direction. Turning axis 505 extends in the Z-axis direction.

Automatic tool changer 141 may include a single type arm portion having one gripping portion instead of double arm 144.

As illustrated in FIGS. 5, 8 and 9, when automatic tool changer 141 is positioned at standby position Pa, double arm 144 is disposed in a middle position of a middle height.

As illustrated in FIGS. 6, 10, and 11, when automatic tool changer 141 moves from standby position Pa to internal-side tool changing position Pb to perform the tool change between automatic tool changer 141 and tool spindle 121, lifting arm 143 is lowered in the −X axis direction, so that double arm 144 is disposed at a lower position lower than the middle position. Thus, double arm 144 can be moved close to tool spindle 121 in the X-axis direction (vertical direction).

As illustrated in FIG. 7, when automatic tool changer 141 moves from standby position Pa to magazine-side tool changing position Pc in order to perform the tool change between tool spindle 121 and tool magazine 171, lifting arm 143 is lifted in the +X-axis direction, so that double arm 144 is disposed at a higher position than the middle position. Thus, double arm 144 moving to the magazine-side tool changing position can be prevented from interfering with tool magazine 171.

An opening avoiding the interference between lifting arm 143 performing the lifting operation and a ceiling portion may be provided in the ceiling portion at magazine-side tool changing position Pc. A shutter capable of opening and closing the opening may be provided in the ceiling portion.

Referring to FIGS. 8 to 11, processing machine 100 further includes a third transverse frame 157. Third transverse frame 157 has a beam shape in which the Z-axis direction (left-right direction) is the longer direction. Third transverse frame 157 is provided above first transverse frame 154. A guard body 611 described later is attached to third transverse frame 157.

Splash guard 181 includes a first slide cover 351 and a second slide cover 353. First slide cover 351 and second slide cover 353 have a flat plate shape parallel to the X-axis-Z-axis plane as a whole. First slide cover 351 and second slide cover 353 are disposed on the back side of processing area 110 (the end of processing area 110 in the −Y-axis direction).

Ram 163 penetrates first slide cover 351 from the outside of processing area 110 and enters processing area 110 in the Y-axis direction. First slide cover 351 is slidably deformable in the X-axis direction and the Z-axis direction in accordance with the movement of ram 163 in the X-axis direction and the Z-axis direction.

Second slide cover 353 is provided above first slide cover 351. Second slide cover 353 is provided between third transverse frame 157 and first transverse frame 154 in the X-axis direction. The end of second slide cover 353 in the −Z-axis direction is connected to a cover body 612 described later. Second slide cover 353 is slidably deformable in the Z-axis direction in accordance with the movement of cover body 612 in the Z-axis direction.

Referring to FIG. 3, a line body insertion hole 352 is made in second slide cover 353. Line body insertion hole 352 is a through-hole penetrating second slide cover 353 in the Y-axis direction. Line body 210 (flexible tube 211) is inserted into line body insertion hole 352 from the inside of processing area 110 to be drawn out of processing area 110. Second slide cover 353 is slidably deformable in the Z-axis direction in accordance with movement of line body 210 (flexible tube 211) in the Z-axis direction.

Referring to FIGS. 8 to 11, splash guard 181 further includes guard body 611 and cover body 612.

Guard body 611 has a flat plate shape parallel to the X-Y axis plane as a whole. Guard body 611 is disposed on the left side of processing area 110 (the end of processing area 110 in the −Z-axis direction). Processing area 110 is provided on the +Z-axis direction side with respect to guard body 611, and standby position Pa of automatic tool changer 141 and laser tool storage portion 191 are provided on the −Z-axis direction side with respect to guard body 611.

An oil pan 614 is provided between standby position Pa of automatic tool changer 141 and laser tool storage portion 191. Oil pan 614 has a tray shape and extends between tool magazine 171 and guard body 611 in the Z-axis direction.

An opening and closing cover 613 is provided in guard body 611. Opening and closing cover 613 performs an opening and closing operation when laser tool 133 is replaced between laser tool storage portion 191 and additive-manufacturing head 131. Opening and closing cover 613 is a foldable cover that is folded and deformed during the closing operation.

A stocker storing a plurality of long boring bars may be provided below standby position Pa of automatic tool changer 141 instead of laser tool storage portion 191.

An opening 616 is provided in guard body 611. Opening 616 is a through-hole penetrating guard body 611 in the Z-axis direction. Opening 616 communicates between standby position Pa of automatic tool changer 141 and processing area 110. Opening 616 is provided above opening and closing cover 613.

Cover body 612 is provided so as to cover opening 616. Cover body 612 has a planar shape corresponding to the opening shape of opening 616 when viewed in the Z-axis direction. Cover body 612 is disposed on a side of double arm 144. Cover body 612 is provided at a position adjacent to double arm 144 in the +Z-axis direction.

Cover body 612 operates so as to be able to open and close opening 616. Cover body 612 is coupled to automatic tool changer 141. Cover body 612 moves in the Z-axis direction integrally with automatic tool changer 141 along with the movement of automatic tool changer 141 in the Z-axis direction.

As illustrated in FIGS. 8 and 9, when automatic tool changer 141 is positioned at standby position Pa, cover body 612 blocks opening 616 to define and form processing area 110. At this point, processing area 110 is substantially sealed by splash guard 181.

As illustrated in FIGS. 10 and 11, when automatic tool changer 141 moves from standby position Pa to internal-side tool changing position Pb, cover body 612 enters the inside of processing area 110 together with automatic tool changer 141. At this point, processing area 110 communicates with standby position Pa through opening 616.

According to such the configuration, when automatic tool changer 141 is positioned at standby position Pa outside processing area 110, cover body 612 defines and forms processing area 110, so that cutting oil, chips, or the like generated in processing area 110 can be prevented from adhering to automatic tool changer 141. Thus, automatic tool changer 141 and the tools held by automatic tool changer 141 are kept clean, so that the operation of the automatic tool change by automatic tool changer 141 can be executed more stably.

In addition, when automatic tool changer 141 moves from standby position Pa to internal-side tool changing position Pb, cover body 612 enters the inside of processing area 110 together with automatic tool changer 141 instead of the opening and closing operation like a general sliding type shutter. Thus, because the space where the opening and closing operation of cover body 612 is enabled is not required, the size of processing machine 100 can be reduced.

As illustrated in FIG. 11, during the tool change between automatic tool changer 141 and tool spindle 121, double arm 144 performs the turning operation about turning axis 505 parallel to the horizontal direction above tool spindle 121. In this case, cover body 612 is disposed not below double arm 144 but on the side of double arm 144, so that double arm 144 that performs the turning operation can be avoided from interfering with cover body 612.

Figures 13, 14:
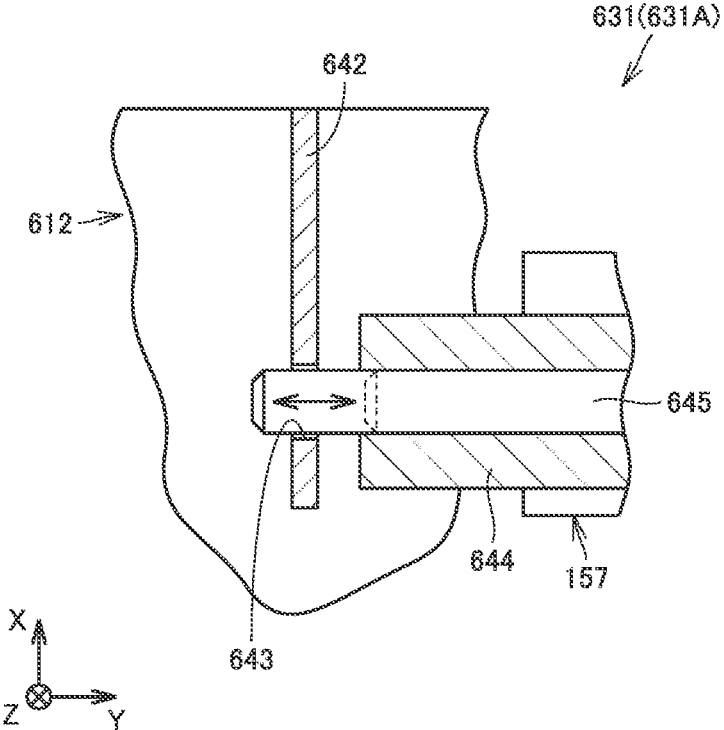
FIG. 13 is a sectional view illustrating a range surrounded by a two-dot chain line XIII in FIG. 12.
FIG. 14 is a sectional view illustrating a range surrounded by a two-dot chain line XIV in FIG. 12.

FIG. 13 is a sectional view illustrating a range surrounded by a two-dot chain line XIII in FIG. 12. Referring to FIGS. 12 and 13, processing machine 100 further includes a first coupling mechanism 651 (in FIG. 12, because first coupling mechanism 651 is disposed on the back side of automatic tool changer 141 and cover body 612, first coupling mechanism 651 is not illustrated). First coupling mechanism 651 is operable between a first state in which automatic tool changer 141 and cover body 612 are coupled by first coupling mechanism 651 when automatic tool changer 141 is positioned at standby position Pa and a second state in which the coupling between automatic tool changer 141 and cover body 612 are released when automatic tool changer 141 moves from standby position Pa to magazine-side tool changing position Pc.

An air cylinder 653 is attached to automatic tool changer 141 (base 148). Air cylinder 653 includes a pin 654. Pin 654 is movable forward and backward in the Y-axis direction by driving air cylinder 653. A coupling portion 655 is provided in cover body 612. A pin insertion hole 652 is made in coupling portion 655. Pin insertion hole 652 is a through-hole penetrating coupling portion 655 in the Y-axis direction.

Coupling portion 655 constitutes first coupling mechanism 651 together with air cylinder 653. When pin 654 is inserted into pin insertion hole 652, the first state in which automatic tool changer 141 and cover body 612 are connected to each other is obtained. When pin 654 is pulled out of pin insertion hole 652, the second state in which the coupling between automatic tool changer 141 and cover body 612 is released is obtained.

The insertion direction of pin 654 into pin insertion hole 652 is not limited to the Y-axis direction, but may be a direction intersecting the Z-axis, more preferably a direction orthogonal to the Z-axis.

As illustrated in FIGS. 5 and 6, when automatic tool changer 141 is positioned at standby position Pa, automatic tool changer 141 and cover body 612 are coupled by first coupling mechanism 651, so that cover body 612 can be caused to immediately enter processing area 110 together with automatic tool changer 141 in the case of shifting to the tool change at internal-side tool changing position Pb.

As illustrated in FIG. 7, when automatic tool changer 141 moves from standby position Pa to magazine-side tool changing position Pc, the coupling between automatic tool changer 141 and cover body 612 by first coupling mechanism 651 is released, so that only automatic tool changer 141 can be directed to magazine-side tool changing position Pc where tool magazine 171 is located while the state in which processing area 110 is defined and formed by cover body 612 is maintained.

Figure 15:
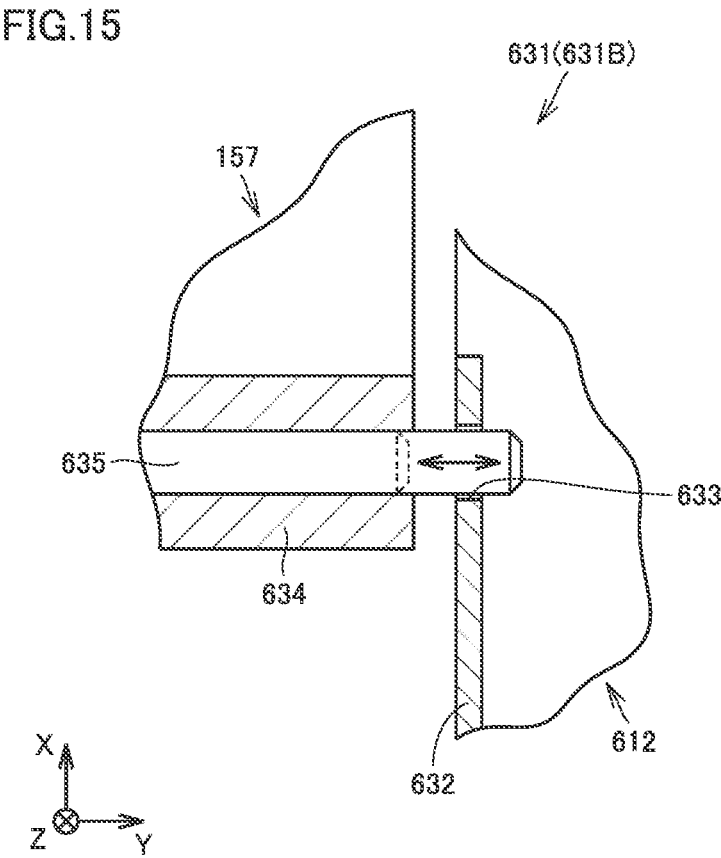
FIG. 15 is a sectional view illustrating a range surrounded by a two-dot chain line XV in FIG. 12.

FIG. 14 is a sectional view illustrating a range surrounded by a two-dot chain line XIV in FIG. 12. FIG. 15 is a sectional view illustrating a range surrounded by a two-dot chain line XV in FIG. 12.

Referring to FIGS. 12, 14 and 15, processing machine 100 further includes a second coupling mechanism 631. Second coupling mechanism 631 is operable between a third state in which guard body 611 and cover body 612 are coupled by the second coupling mechanism when automatic tool changer 141 is positioned at standby position Pa and a fourth state in which coupling between guard body 611 and cover body 612 are released when automatic tool changer 141 moves from standby position Pa to internal-side tool changing position Pb.

Processing machine 100 includes a plurality of second coupling mechanisms 631 (631A, 631B). Second coupling mechanism 631B is provided at a position away from second coupling mechanism 631A in the obliquely upward direction (−Y-axis direction and +X-axis direction).

Referring to FIGS. 12 and 14, an air cylinder 644 is attached to guard body 611. Air cylinder 644 includes a pin 645. Pin 645 is movable forward and backward in the Y-axis direction by driving air cylinder 644. A coupling portion 642 is provided in cover body 612. A pin insertion hole 643 is made in coupling portion 642. Pin insertion hole 643 is a through-hole penetrating coupling portion 642 in the Y-axis direction.

Coupling portion 642 constitutes second coupling mechanism 631A together with air cylinder 644. When pin 645 is inserted into pin insertion hole 643, the third state in which guard body 611 and cover body 612 are coupled to each other is obtained. When pin 645 is removed from pin insertion hole 643, the fourth state in which the coupling between guard body 611 and cover body 612 is released is obtained.

Referring to FIGS. 12 and 15, an air cylinder 634 is attached to third transverse frame 157. Air cylinder 634 includes a pin 635. Pin 635 is movable forward and backward in the Y-axis direction by driving air cylinder 634. A coupling portion 632 is provided in cover body 612. A pin insertion hole 633 is made in coupling portion 632. Pin insertion hole 633 is a through-hole penetrating coupling portion 632 in the Y-axis direction.

Coupling portion 632 constitutes second coupling mechanism 631B together with air cylinder 634. When pin 635 is inserted into pin insertion hole 633, the third state in which guard body 611 and cover body 612 are coupled with third transverse frame 157 interposed therebetween is obtained. When pin 635 is removed from pin insertion hole 633, the fourth state in which the coupling between guard body 611 and cover body 612 is released is obtained.

According to such the configuration, when automatic tool changer 141 is positioned at standby position Pa, guard body 611 and cover body 612 are coupled by second coupling mechanism 631 (631A, 631B), so that cover body 612 is more firmly fixed to guard body 611. Thus, sealability of processing area 110 is improved, so that leakage of cutting oil, chips, or the like from the inside to the outside of processing area 110 can reliably prevented. When automatic tool changer 141 moves from standby position Pa to internal-side tool changing position Pb, the coupling between guard body 611 and cover body 612 by second coupling mechanism 631 (631A, 631B) is released, so that cover body 612 can be separated from guard body 611 and enter processing area 110 together with automatic tool changer 141.

Processing machine 100 of the embodiment of the present invention described above includes splash guard 181 that defines and forms processing area 110, tool spindle 121 that is provided inside processing area 110 and serves as the tool holder holding the tool, and automatic tool changer 141 that is movable between internal-side tool changing position Pb as the first tool changing position inside processing area 110 and standby position Pa outside processing area 110 and changes the tool held by tool spindle 121 at internal-side tool changing position Pb. Splash guard 181 includes cover body 612 that is coupled to automatic tool changer 141, defines and forms processing area 110 when automatic tool changer 141 is positioned at standby position Pa, and enters processing area 110 when automatic tool changer 141 moves from standby position Pa to internal-side tool changing position Pb.

According to processing machine 100 of the embodiment of the present invention configured as described above, cutting oil, chips, or the like can be prevented from adhering to automatic tool changer 141 while the size of the machine is reduced.

In the embodiment, the case where the AM/SM hybrid processing machine is configured based on the combined processing machine having the turning function and the milling function has been described. However, the present invention is not limited to such the configuration, and for example, the AM/SM hybrid processing machine may be configured based on a machining center having the milling function. In addition, the present invention is not limited to the AM/SM hybrid processing machine, but may be applied to a lathe, a machining center, or a combined processing machine having a turning function and a milling function. For example, when the present invention is applied to the lathe, a tool holder that holds the tool may be a tool rest having an automatic tool changing function.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

The present invention is applied to various processing machines including the automatic tool changer.

REFERENCE SIGNS LIST

100: processing machine, 110: processing area, 111: first workpiece spindle, 116: second workpiece spindle, 121: tool spindle, 122: spindle end face, 123: side surface portion, 124: front surface portion, 131: additive-manufacturing head, 132: head body, 133: laser tool, 136: disk portion, 141: automatic tool changer, 142, 147: servomotor, 143: lifting arm, 144: double arm, 144P: first gripping portion, 144Q: second gripping portion, 145, 156: rack, 146: pinion, 148, 331: base, 151: bed, 152: first longitudinal frame, 153: second longitudinal frame, 154: first transverse frame, 155, 312: rail, 157: third transverse frame, 161: saddle, 162: cross slide, 163: ram, 171: tool magazine, 181: splash guard, 191: laser tool storage portion, 192: head storage portion, 210: line body, 211: flexible tube, 211*p*: one end, 211*q*: the other end, 221: support, 311: second transverse frame, 332: pulley portion, 333: coil spring, 334: bracket, 335: tension applying mechanism, 336, 381: block, 341: material powder supply device, 342: laser oscillation device, 351: first slide cover, 352: line body insertion hole, 353: second slide cover, 360: second guide mechanism, 370: first guide mechanism, 372, 411: slider, 380: coupling mechanism, 382, 634, 644, 653: air cylinder, 501, 502, 503, 526: rotation axis, 504, 505: turning axis, 611: guard body, 612: cover body, 613: opening and closing cover, 614: oil pan, 616: opening, 631, 631A, 631B: second coupling mechanism, 632, 642, 655: coupling portion, 633, 643, 652: pin insertion hole, 635, 645, 654: pin, 651: first coupling mechanism

The invention claimed is:

1. A processing machine comprising:
a splash guard;
a processing area in which a workpiece is processed;
a tool holder that is provided in the processing area and that holds a first tool for processing the workpiece;
a tool magazine that is provided outside of the processing area and that stores a plurality of tools;
a first coupling mechanism; and
an automatic tool changer that is movable in a linear direction between a first tool changing position located inside the processing area and a standby position located outside of the processing area and that changes the first tool held by the tool holder at the first tool changing position, the splash guard separating the processing area and an area where the standby position is,
wherein the splash guard includes a cover body that is connected to the automatic tool changer and that is movable in the linear direction integrally with the automatic tool changer, the cover body separating the processing area from the area where the automatic tool changer is positioned at the standby position, and the cover body entering the processing area when the automatic tool changer moves from the standby position to the first tool changing position, wherein the automatic tool changer is further movable between the standby position and a second tool changing position located outside of the processing area, the automatic tool changer automatically changing the first tool between the tool magazine and the automatic tool changer at the second tool changing position, wherein the first coupling mechanism is operable between a first state in which the automatic tool changer and the cover body are coupled by the first coupling mechanism when the automatic tool changer is positioned at the standby position and a second state in which the automatic tool changer and the cover body are uncoupled when the automatic tool changer moves from the standby position to the second tool changing position.

2. The processing machine according to claim 1, further comprising:
a workpiece spindle that holds the workpiece and rotates the workpiece about a rotation axis extending parallel to a horizontal direction,
wherein the automatic tool changer is movable in an axial direction extending parallel to the rotation axis and is movable to the processing area.

3. The processing machine according to claim 1, wherein the splash guard further includes a guard body having an opening in which the cover body is disposed when the automatic tool changer is positioned at the standby position, and
the processing machine further comprises a second coupling mechanism operable between a third state in which the guard body and the cover body are coupled by the second coupling mechanism when the automatic tool changer is positioned at the standby position and a fourth state in which the guard body and the cover body are uncoupled when the automatic tool changer moves from the standby position to the first tool changing position.

4. The processing machine according to claim 1, wherein the automatic tool changer includes an arm portion capable of turning about a turning axis which extends parallel to a horizontal direction, the arm portion including a gripper portion capable of gripping the first tool, and
the cover body is disposed on a side of the arm portion.

\* \* \* \* \*